United States Patent
Bender et al.

[11] Patent Number: 5,556,131
[45] Date of Patent: Sep. 17, 1996

[54] GAS GENERATOR FOR SIDE IMPACT PROTECTION

[75] Inventors: Richard Bender, Lauf; Lothar Maier, Tüssling, both of Germany

[73] Assignee: Temic Bayern-Chemie Airbag GmbH, Aschau, Germany

[21] Appl. No.: 403,099

[22] Filed: Mar. 13, 1995

[30] Foreign Application Priority Data

May 3, 1994 [DE] Germany .......................... 44 15 523.9

[51] Int. Cl.⁶ .......................... B60R 21/26; B60R 21/16; B60R 21/02
[52] U.S. Cl. ........................................ 280/741; 280/740
[58] Field of Search ....................... 280/741, 740

[56] References Cited

U.S. PATENT DOCUMENTS

| | | | |
|---|---|---|---|
| 3,715,131 | 2/1973 | Hurley et al. | 280/732 |
| 3,877,882 | 4/1975 | Lette et al. | 23/281 |
| 3,880,447 | 4/1975 | Thorn et al. | 280/731 |
| 5,058,921 | 10/1991 | Cuevas | 280/741 |
| 5,199,155 | 4/1993 | Cord et al. | 280/741 |
| 5,213,362 | 5/1993 | Coultas | 280/741 |

FOREIGN PATENT DOCUMENTS

| | | |
|---|---|---|
| 0332325 | 9/1989 | European Pat. Off. . |
| 0447030 | 9/1991 | European Pat. Off. . |
| 0488938 | 6/1992 | European Pat. Off. . |
| 2675098 | 10/1992 | France . |
| 2712963 | 11/1977 | Germany . |
| 4008243 | 9/1991 | Germany . |
| 4207253 | 9/1992 | Germany . |
| 4212357 | 10/1992 | Germany . |
| 4218252 | 12/1992 | Germany . |
| 1152824 | 4/1985 | U.S.S.R. . |
| 2232936 | 1/1991 | United Kingdom . |

*Primary Examiner*—Kenneth R. Rice
*Attorney, Agent, or Firm*—Spencer & Frank

[57] ABSTRACT

Gas generator for an airbag that provides protection against side impact in a vehicle. The gas generator has a housing with a flange for attaching the gas generator to a part of the vehicle, in particular to the backrest of a vehicle seat, and for fixing the airbag. The gas generator also has a sealed fluid-tight propellant tank that acts as combustion chamber. The propellant tank is arranged concentrically in the housing such that an annular chamber is formed between the housing and the propellant tank to allow afterburning. The annular chamber can be connected on the one hand to the inside of the propellant tank through the passage that opens as a result of the burning process and on the other hand to the inside of the airbag through the outlet apertures provided in the housing wall, but otherwise it is sealed fluid-tight. The construction of the generator is therefore very simple and it is of very small size.

22 Claims, 2 Drawing Sheets

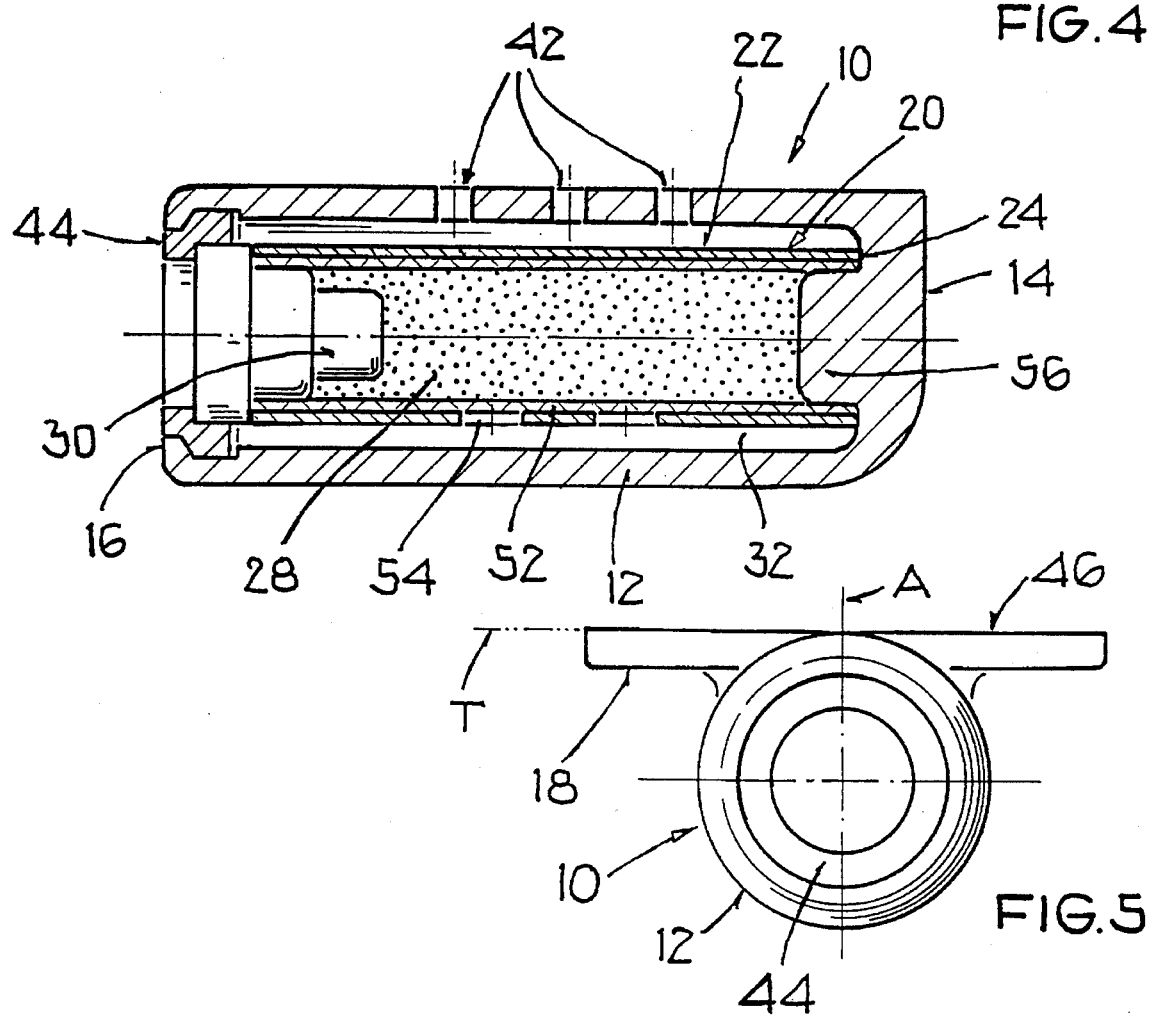
FIG. 4
FIG. 5
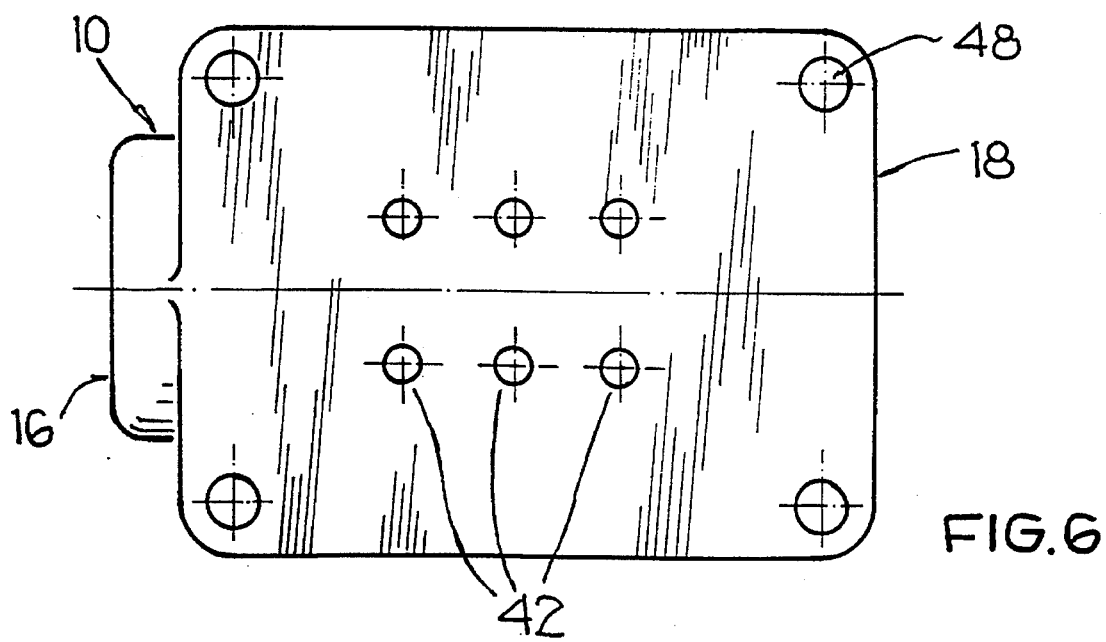
FIG. 6

5,556,131

GAS GENERATOR FOR SIDE IMPACT PROTECTION

BACKGROUND OF THE INVENTION

The invention relates to a gas generator for an airbag in a vehicle.

It is known that conventional airbags protect the vehicle occupants in the event of a frontal impact. In a large number of accidents, however, the vehicle occupants are thrown sideways, that is against the vehicle door or into the vehicle interior, in which case the airbag that inflates in front of the vehicle passengers offers no protection. An airbag that inflates between the vehicle occupants and the adjacent vehicle door (or the vehicle side wall) offering protection against side impact (a sidebag) would be to advantage here.

The gas generator for a sidebag of this kind could be fitted in the vehicle door or in the vehicle seat. The gas generators used for the conventional airbags could at best be fitted in the vehicle door, but generally speaking they are too large for fitting in the vehicle seat. Furthermore, the conventional gas generators are of elaborate design and correspondingly expensive.

SUMMARY OF THE INVENTION

The object of the invention is to provide a gas generator for an airbag intended to provide protection against a side impact and being of simple construction and having small overall dimensions. Even so, ignition and burning should take place as quickly as possible without entailing the risk of propellant particles finding their way into the airbag.

According to the invention, the gas generator is provided with a housing having a peripheral wall and a flange for attaching the gas generator to a part of the vehicle and for attaching the airbag, and with a sealed fluid-tight propellant tank serving as combustion chamber that has a peripheral wall and two front ends and includes a propellant together with an igniter, the propellant tank being so arranged in the housing that, to allow afterburning, between the peripheral walls of the housing and the propellant tank an annular chamber is formed which can be connected on the one hand to the inside of the propellant tank through a passage that opens as a result of the combustion process, and on the other hand to the inside of the airbag, which is otherwise fluid-tight, through the outlet apertures created in the peripheral wall of the housing.

The design of the gas generator according to the invention is of very simple construction. In particular, no threads and no welding seam are needed. Another excellent feature is the very small size. The gas generator can therefore be fitted in, for example, the backrest of a vehicle seat. Manufacture and assembly are extremely simple.

At the same time, very rapid ignition and burning are ensured. Furthermore, since a chamber is provided for afterburning of the propellant, there is no risk of unburned or still burning propellant particles reaching the inside of the airbag.

BRIEF DESCRIPTION OF THE DRAWINGS

Two preferred embodiment examples of the invention will now be described in more detail on the basis of the drawings. These show:

FIG. 4 A longitudinal section through a second embodiment example of a gas generator constructed in accordance with the invention.

FIG. 5 An end view of the gas generator shown in FIG. 4.

FIG. 6 A top view on the gas generator shown in FIGS. 4 and 5.

DESCRIPTION OF THE PREFERRED EMBODIMENTS

Figure 1:
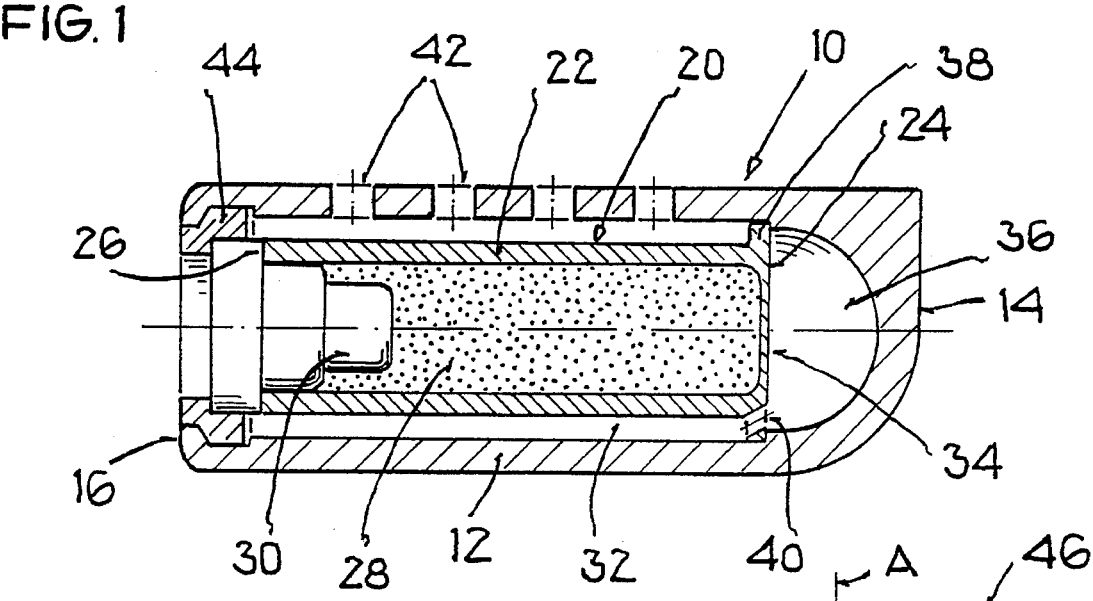
FIG. 1 A longitudinal section through a first embodiment example of a gas generator constructed in accordance with the invention.
Figure 2:
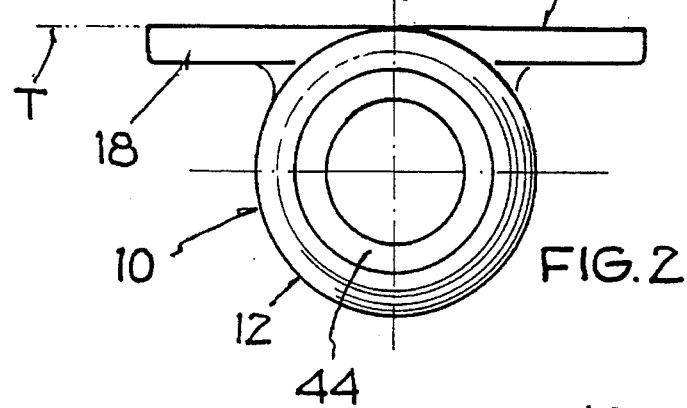
FIG. 2 An end view of the gas generator shown in FIG. 1.
Figure 3:
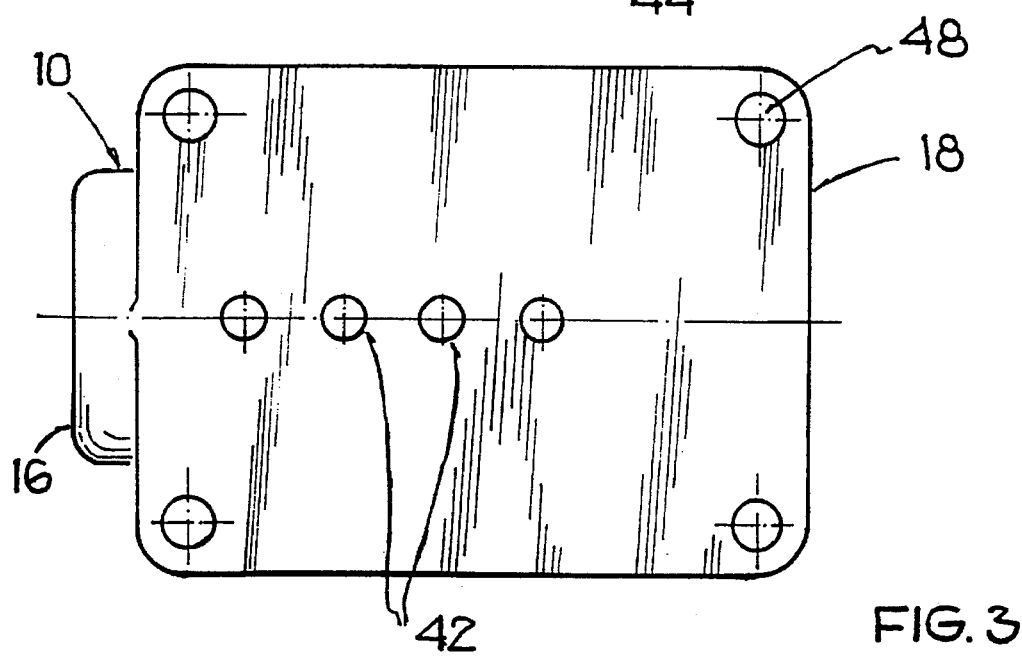
FIG. 3 A top view on the gas generator shown in FIGS. 1 and 2.

Reference is made first of all to the gas generator shown in FIGS. 1 to 3 that supplies the gas for an airbag (not shown) offering protection against side impact in a vehicle (not shown).

The gas generator has a housing 10 with a cylindrical peripheral wall 12, a front end 14 constructed as a closed wall, a front end 16 provided with an access opening, and a flange 18. Concentrically arranged in the housing 10, there is a propellant tank 20 with a cylindrical peripheral wall 22, a front end 24 constructed as a closed wall, and an open opposite front end 26. The propellant tank 20 contains a gas-generating propellant 28. Furthermore, in the region of the front ends 16 and 26, an igniter 30 is placed in the propellant tank 20 or propellant 28, thus sealing the inside of the propellant tank 20 fluid-tight.

The peripheral walls 12 and 22 are spaced out radially such that an annular chamber 32 is created between the housing 10 and the propellant tank 20. The propellant tank 20 has a reduced wall thickness at its front end 24 so that the front end 24 acts as a bursting diaphragm 34 that bursts when combustion takes place. Adjacent to the front end 24, the housing 10 forms an afterburn chamber 36. The afterburn chamber 36 is separated from the annular chamber 32 by an annular wall formed on the front end 38 of the propellant tank 20; only in one (in FIG. 1) lower peripheral region is there a through-flow aperture 40 or several such apertures. In the embodiment example shown, the afterburn chamber 36 is of semi-spherical shape, but it could also have another shape. Advantageously, its volume is sufficient for complete afterburning.

The bursting diaphragm 34, the afterburn chamber 36 and the through-flow apertures 40 provided in the annular wall 38 form a passage between the inside of the propellant tank 20 and the annular chamber 32 that opens when combustion takes place. The annular chamber 32 is in turn connected to the inside of the airbag (not shown) through outlet apertures 42 provided in the peripheral wall 12 of the housing 10. The through-flow apertures 40 and the outlet apertures 42 are arranged in regions displaced from one another by 180° so that propellant gas flowing in through the through-flow apertures 40 flows through the entire annular chamber 32 before it can escape from the outlet apertures 42.

On the (in FIG. 1) left-side end of the housing 10 an annular spacer 44 is inserted that positions the igniter (not shown) and it in turn is held by the rolled-in housing edge in housing 10. Except with respect to the through-flow apertures 40 and the outlet apertures 42, the annular chamber 32 is thus sealed fluid-tight.

The flange 18 is made as one piece with the peripheral wall 12 and the front end 14 of the housing 10. As can be seen in FIG. 2, the flange 18 is arranged relative to the peripheral wall 12 such that its base surface 46 that faces away from the peripheral wall is situated in a tangential plane T which is tangential to the external periphery of the cylindrical peripheral wall 12. As can be seen in FIG. 3 in particular, the flange 18 has an approximately rectangular contour and is arranged symmetrically to the axial plane A of the peripheral wall 12, with this axial plane A being arranged perpendicularly to the tangential plane T.

In the embodiment example shown in FIGS. 1 to 3, four outlet apertures 42 are provided that are located on a line in which the tangential plane T and the axial plane A intersect. It is understood, however, that another quantity and another arrangement of outlet apertures 42 are possible. Furthermore, the flange 18 is provided with fastening holes 48 in the region of its four (rounded) corners.

The gas generator is attached, for example, on the skeleton of the backrest (not shown) of a vehicle seat in such a way that it is located inside the backrest and only the base surface 46 shows towards the outside and at the same time faces the airbag (not shown). If the gas generating propellant 28 is ignited, the bursting diaphragm 34 bursts open. The hot gas then flows through the afterburn chamber 36, the through-flow apertures 40, the annular chamber 32 and the outlet apertures 42 into the inside of the airbag. Since the propellant in the afterburn chamber 36, and possibly also still in the annular chamber 32, is capable of afterburning, it is ensured that no unburned or still burning propellant particles find their way into the inside of the airbag.

A filter and cooling material (for example in the form of a metal mesh construction) can be placed in the annular chamber 32, and possibly also in the afterburn chamber 36. This allows the inflation behavior of the gas generator to be modified. In particular, this allows the temperature and pressure inside the airbag to be controlled.

The embodiment example shown in FIGS. 4 to 6 corresponds largely to the embodiment example shown in FIGS. 1 to 3. Equivalent components have therefore been designated with the same reference numbers.

A difference is that in the embodiment example shown in FIGS. 4 to 6, the peripheral wall 22 of the propellant tank 20 is made in the form of a cylindrical sleeve open on both sides and pushed with its front end 24 onto a projection 56 inside the housing. The propellant tank 20 is thus sealed fluid-tight at its front end 24. Instead of a bursting diaphragm at the front end, through-flow apertures 54 are provided in the peripheral wall 22 of the propellant tank 20 that are sealed on the inside by an insulating foil 52. The through-flow apertures are in a region that is displaced by 180° from the outlet apertures 42.

In the embodiment example shown in FIGS. 4 to 6, the insulating foil 52 is torn open in the region of the through-flow apertures 54 by the burning process so that the hot gas flows from the propellant tank 20 directly (and not via another afterburn chamber) into the annular chamber 32 from whence it passes through the outlet apertures 42 into the airbag.

FIG. 6 shows as another possible embodiment of the outlet apertures 42 a group of six apertures arranged on both sides along the line of intersection of the tangential plane T and the axial plane A.

Otherwise, the embodiment example shown in FIGS. 4 to 6 is identical both in terms of construction and function to the embodiment example shown in FIGS. 1 to 3 so that no further explanations are needed.

What is claimed is:

1. A gas generator for an airbag serving to protect against side impact in a vehicle, comprising:

a housing having a peripheral wall with outlet apertures and being sealed at one front end;

a sealed fluid-tight propellant tank which serves as a combustion chamber and which has a peripheral wall and first and second front ends;

a propellant disposed in said propellant tank;

a bursting diaphragm, which bursts upon ignition of said propellant, disposed at and sealing said first front end of said propellant tank, said bursting diaphragm having a diameter corresponding to an inside diameter of said housing;

said propellant tank being arranged in said housing such that, to allow afterburning, an annular chamber is formed between said peripheral walls of said housing and of said propellant tank, and such that a further afterburn chamber is formed between said sealed one front end of said housing and said bursting diaphragm;

an igniter for the propellant disposed at said second front end of said propellant tank and sealing both said second front end of said propellant tank and a second front end of said housing;

at least one through-flow aperture extending between said further afterburn chamber and said annular chamber and arranged such that hot gas entering said annular chamber through said at least one through-flow aperture flows through the entire annular chamber before passing through said outlet apertures formed in said peripheral wall of said housing; and, an external flange provided on said peripheral wall of said housing for attaching the gas generator to a part of the vehicle as well as for attaching the airbag.

2. Gas generator in accordance with claim 1, wherein the afterburn chamber has a volume that is adequate for complete afterburning.

3. Gas generator in accordance with claim 2, wherein a filter and cooling material is situated in the annular chamber between the peripheral walls.

4. Gas generator in accordance with claim 3, wherein the flange can be attached to the backrest of a vehicle seat.

5. Gas generator in accordance with claim 4, wherein the flange and the peripheral wall of the housing are made in one piece.

6. Gas generator in accordance with claim 5, wherein the peripheral walls of the housing and the propellant tank are of cylindrical shape.

7. Gas generator in accordance with claim 6, wherein the flange base surface facing the airbag is in a tangential plane of the peripheral wall of the housing.

8. Gas generator in accordance with claim 7, wherein the outlet apertures are arranged along a line in which the tangential plane intersects with the axial plane of the peripheral wall of the housing, this axial plane being perpendicular to the tangential plane.

9. Gas generator in accordance with claim 1, wherein a filter and cooling material is placed in the afterburn chamber adjacent to the front end of the propellant tank.

10. Gas generator in accordance with claim 9, wherein the flange can be attached to the backrest of a vehicle seat.

11. Gas generator in accordance with claim 10, wherein the flange and the peripheral wall of the housing are made in one piece.

12. Gas generator in accordance with claim 11, wherein the peripheral walls of the housing and the propellant tank are of cylindrical shape.

13. Gas generator in accordance with claim 12, wherein the flange base surface facing the airbag is in a tangential plane of the peripheral wall of the housing.

14. Gas generator in accordance with claim 13, wherein the outlet apertures are arranged along a line in which the tangential plane intersects with the axial plane of the peripheral wall of the housing, this axial plane being perpendicular to the tangential plane.

15. A gas generator for an airbag serving to protect against side impact in a vehicle comprising:

- a housing having a peripheral wall and an end wall at one front end to define a cylindrical chamber sealed at said one front end;
- outlet apertures disposed in said peripheral wall of said housing;
- a projection formed integral with said end wall of said housing and extending into said cylindrical chamber of said housing;
- a sealed fluid-tight propellant tank which serves as combustion chamber and which has a peripheral wall and first and second front ends;
- a propellant disposed in said propellant tank;
- said propellant tank being arranged in said housing such that, to allow afterburning, an annular chamber is formed between said peripheral walls of said housing and of said propellant tank, and such that said first end of said propellant tank is pushed onto said projection on said end wall of said housing and is sealed fluid-tight;
- an igniter for the propellant disposed at said second front end of said propellant tank and sealing both said second front end of said propellant tank and a second front end of said housing;
- a plurality of through-flow apertures provided in said peripheral wall of said propellant tank and arranged such that hot gas entering said annular chamber through said through-flow apertures of said propellant tank flows through the entire said annular chamber before passing through said outlet apertures formed in said peripheral wall of said housing; and,
- an external flange provided on said peripheral wall of said housing for attaching the gas generator to a part of the vehicle as well as for attaching the airbag.

16. Gas generator in accordance with claim 15, wherein said through-flow apertures in the peripheral wall of the propellant tank are normally sealed by an insulating foil that tears open as a result of the burning process of the propellant.

17. Gas generator in accordance with claim 16, wherein a filter and cooling material is situated in the annular chamber between the peripheral walls.

18. Gas generator in accordance with claim 17, wherein the flange can be attached to the backrest of a vehicle seat.

19. Gas generator in accordance with claim 18, wherein the flange and the peripheral wall of the housing are made in one piece.

20. Gas generator in accordance with claim 19, wherein the peripheral walls of the housing and the propellant tank are of cylindrical shape.

21. Gas generator in accordance with claim 20, wherein the flange base surface facing the airbag is in a tangential plane of the peripheral wall of the housing.

22. Gas generator in accordance with claim 21, wherein the outlet apertures are arranged along a line in which the tangential plane intersects with the axial plane of the peripheral wall of the housing, this axial plane being perpendicular to the tangential plane.

* * * * *